United States Patent
Coderre

(10) Patent No.: US 7,017,464 B2
(45) Date of Patent: Mar. 28, 2006

(54) WOODWORKING TENSION BOARD

(76) Inventor: Marcel Coderre, 137 Troutstream Dr., Vernon, CT (US) 06040

( * ) Notice: Subject to any disclaimer, the term of this patent is extended or adjusted under 35 U.S.C. 154(b) by 79 days.

(21) Appl. No.: 10/617,583

(22) Filed: Jul. 11, 2003

(65) Prior Publication Data

US 2005/0005754 A1    Jan. 13, 2005

(51) Int. Cl.
  *B26D 7/06* (2006.01)
(52) U.S. Cl. .............................. 83/446; 83/420; 83/440; 83/449; 83/823
(58) Field of Classification Search ................ 83/420, 83/449, 446, 823, 468.5, 440; 144/253.1–253.91
  See application file for complete search history.

(56) References Cited

U.S. PATENT DOCUMENTS

| | | | |
|---|---|---|---|
| 328,691 A | 10/1885 | Lampson et al. | |
| 397,797 A | 2/1889 | Hall | |
| 2,525,894 A | 10/1950 | Graham | |
| 2,699,804 A | 1/1955 | Starnes | |
| 2,927,171 A * | 3/1960 | Rhodes | 200/456 |
| 3,335,390 A * | 8/1967 | Pruonto et al. | 439/142 |
| 4,132,256 A * | 1/1979 | Jones | 144/253.6 |
| 4,476,757 A | 10/1984 | Morris | |
| 6,116,694 A * | 9/2000 | Bullard | 297/452.52 |
| 6,435,485 B1 * | 8/2002 | Greco | 267/36.1 |

* cited by examiner

*Primary Examiner*—Timothy V. Eley
*Assistant Examiner*—Isaac N. Hamilton
(74) *Attorney, Agent, or Firm*—Ira S. Dorman

(57) ABSTRACT

A tension board comprises a bow member that can deform resiliently to apply lateral force to a workpiece pushed between it and the fence of a table saw, and that may have an associated tension gauge element. Combination tools may employ two bow members having different force-generating characteristics, an array of feather members, and a single contact finger.

18 Claims, 4 Drawing Sheets

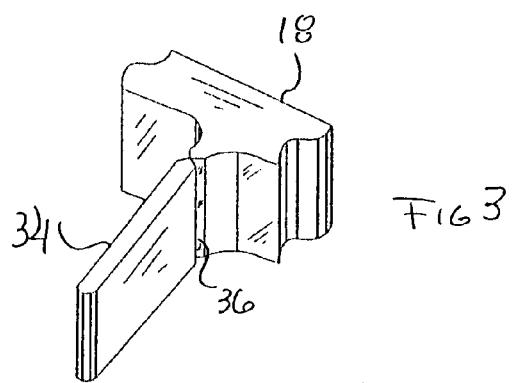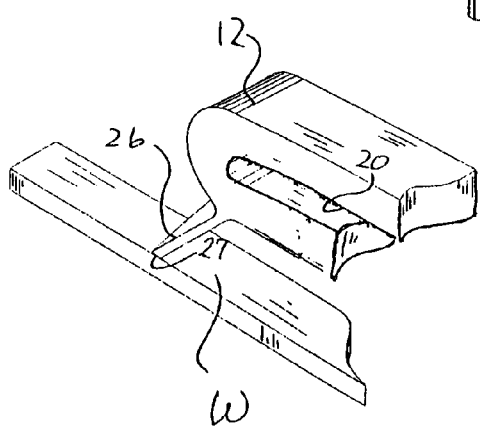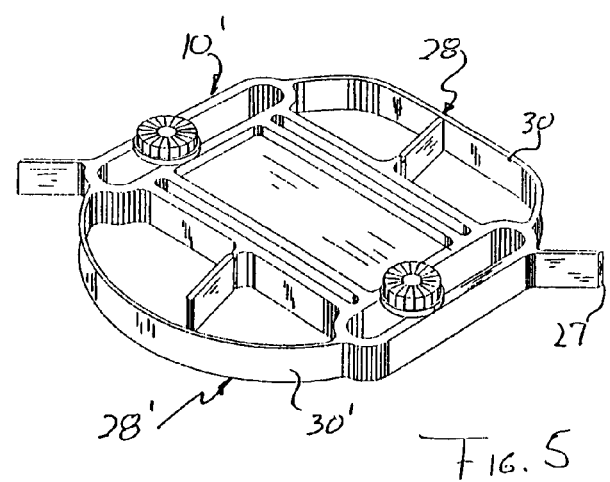

WOODWORKING TENSION BOARD

BACKGROUND OF THE INVENTION

So-called "tension boards" are commonly used to assist in guiding a workpiece through a table saw, router, shaper, or like woodworking machine, and are well know in the art (see for example, Graham U.S. Pat. No. 2,525,894 and Starnes U.S. Pat. No. 2,699,804). The primary function of such a tool is to maintain lateral force upon a workpiece as it is moved along upright fence structure, albeit the device may also be used to apply downward force for maintaining the workpiece against the table surface.

A commercially available tension board, or featherboard, is described in Morris U.S. Pat. No. 4,476,757. It consists of a body having an array of angularly extending, parallel resilient fingers, and two transverse slots. In use, the body of the featherboard is positioned laterally on an expansion bar, slidably seated in a groove of the machine table, to dispose the free ends of the fingers a suitable distance away from the rip fence (i.e., slightly less than the width of the stock to be cut). The stock is advanced between the rip fence and the ends of the fingers, the resilient deflection of which urges the stock against the fence and holds it firmly while it is being cut by the saw blade.

Despite widespread use, tension boards presently available are believed to be less than optimal in a number of respects. In particular, no presently known device permits movement of the stock in both directions, or at least not readily so. For example, while the structure of the Morris featherboard does provide anti-kickback protection, the same features inhibit rearward withdrawal of the stock. Moreover, the featherboard is not very tolerant of misalignment, it tends to mar the contacted edge of the workpiece (particularly if it is lifted from the table surface), it does not accommodate tapered workpieces, and it does not produce a uniform level of tension along its length or enable significant variation of the level of tension applied to the workpiece.

SUMMARY OF THE INVENTION

While some of these disadvantages may be ameliorated by rounding of contact elements, it is the broad object of the present invention to provide a novel woodworking tension board that avoids deficiencies of the prior art devices and that may, at the same time, provide the advantages thereof.

More specific objects of the invention are to provide a tension board that readily permits lifting of the workpiece and movement in opposite directions, that is highly tolerant of misalignment relative to the workpiece and/or the cutting machine fence, that accommodates tapered workpieces, and that affords ready and effective selection and control of applied, uniform tension.

Additional objects are to provide a novel combination tension board which affords a unique choice of force-applying elements.

It has now been found that certain of the foregoing and related objects of the invention are attained by the provision of a tension board comprised of a body having means for mounting upon the surface of woodworking machine table, and at least one resiliently deformable bow member provided by a resilient strip of material having opposite ends attached at mutually spaced points along a first edge of the body and projecting generally arcuately therefrom. In use, the bow member cooperates with upstanding fence structure and deforms resiliently toward the body to apply lateral force to a workpiece pushed between the tension board and the fence.

In preferred embodiments the body and bow member of the tension board will be coplanar and integrally formed, as a single piece, from a synthetic resinous material. The means for mounting will normally comprise at least one slot (usually, rectilinear) formed through the body and extending on an axis generally perpendicular to the "first" edge thereof. The tension board may advantageously include a second bow member, projecting from a second edge of the body, and being of such construction that the proportionate force exerted by its deformation will be substantially different from that of the first bow member.

In further embodiments of the invention the tension board additionally includes a tension gauge element attached to either the body or the strip of material comprising the bow member, and generally disposed within the space defined therebetween. The tension gauge element is so positioned that deformation or the strip of material will cause the gauge element to cooperate with an element on the opposing structure (i.e., the body or the strip, as the case may be) to thereby indicate the level of force being generated by the deformed member. Specifically, the gauge element may have a free outer end portion that contacts the opposing structure to provide the force-level indication.

A combination tension board may include an array of substantially identical, resiliently deflectable, parallel fingers, constituting a featherboard feature, an especially unique aspect of which may reside in the weakening of relatively short fingers, such as by decreasing their width or thickness at least at one location along their length, so as to cause the force produced thereby to substantially match that which is produced by each of the longer fingers. The tension board may also include a single, resiliently deflectable coplanar tab element extending outwardly from the body.

BRIEF DESCRIPTION OF THE DRAWINGS

FIG. 2 is a fragmentary perspective view of a portion of one of the arms of the tension board of FIG. 1, positioned with the hold-down finger thereof bearing upon the surface of a workpiece;

FIG. 3 is a fragmentary perspective view of the tension gauge tab, and associated structure of the tension board;

FIG. 5 is a perspective view of a second form of tension board embodying the invention.

DETAILED DESCRIPTION OF THE PREFERRED AND ILLUSTRATED EMBODIMENTS

Figure 1:
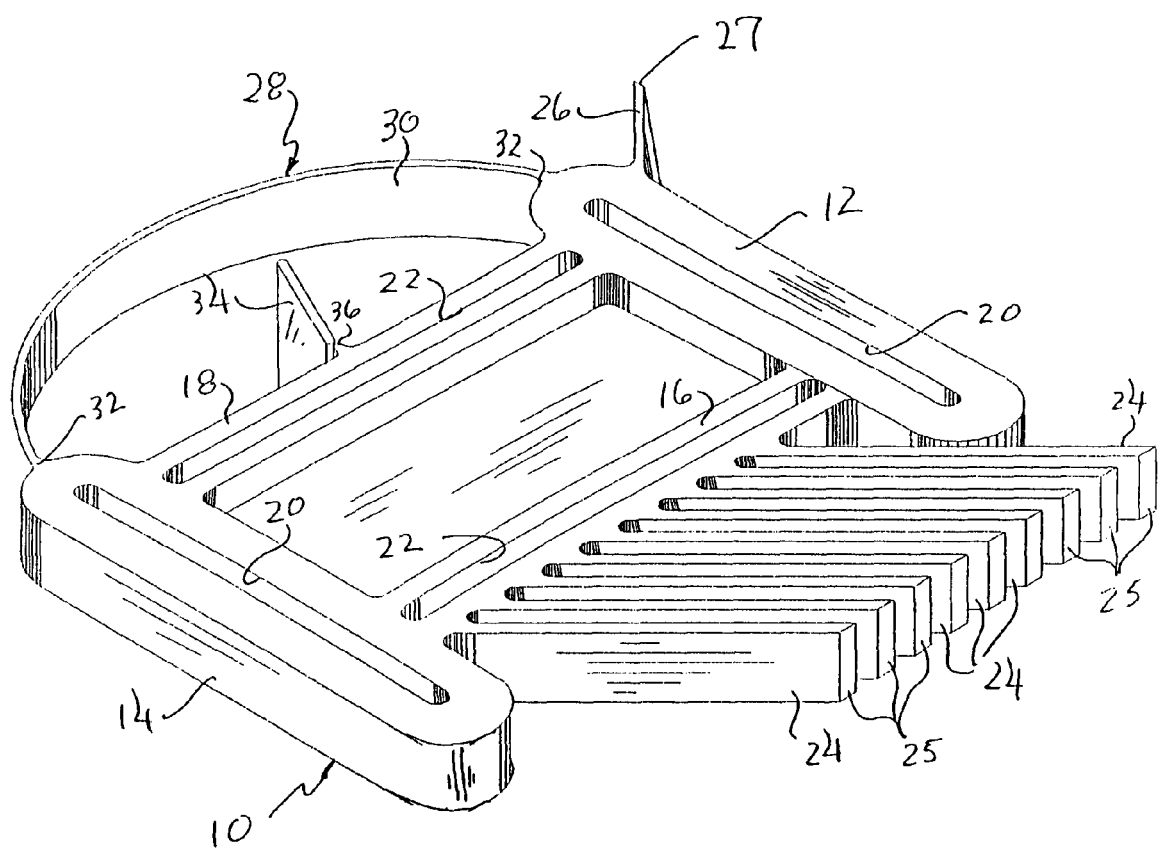
FIG. 1 is a perspective view of a combination tension board embodying the present invention.

Turning now in detail to FIGS. 1 through 3 of the drawings, therein illustrated is a combination tension board embodying the present invention and consisting of a body, generally designated by the numeral 10, having laterally opposite arm portions 12 and 14 and transversely opposite marginal edge portions 16 and 18. The arm portions 12, 14 are slotted at 20, as are the marginal edge portions 16, 18 at 22; albeit other slot arrangements and orientations (e.g., oblique) can be employed, in this embodiment the slots 20 are mutually parallel and are perpendicular to the mutually parallel slots 22.

Nine parallel fingers, or feathers, 24 project, at an acute included angle, from the marginal edge portion 16 of the body 10, and are formed with flat tips 25 disposed on a common plane lying parallel to the slots 22. A single small finger 26 extends from the arm 12, and also terminates in a flat contact surface 27.

An arcuate bow component, generally designated by the numeral 28, consists essentially of a resilient strip 30 attached at points 32 to the ends of the arm portions 12, 14. A tension gauge tab 34, connected to the marginal edge portion 18 by a living hinge at 36, is disposed within the space defined essentially by the strip 30 and the edge portion 18.

Figure 4:
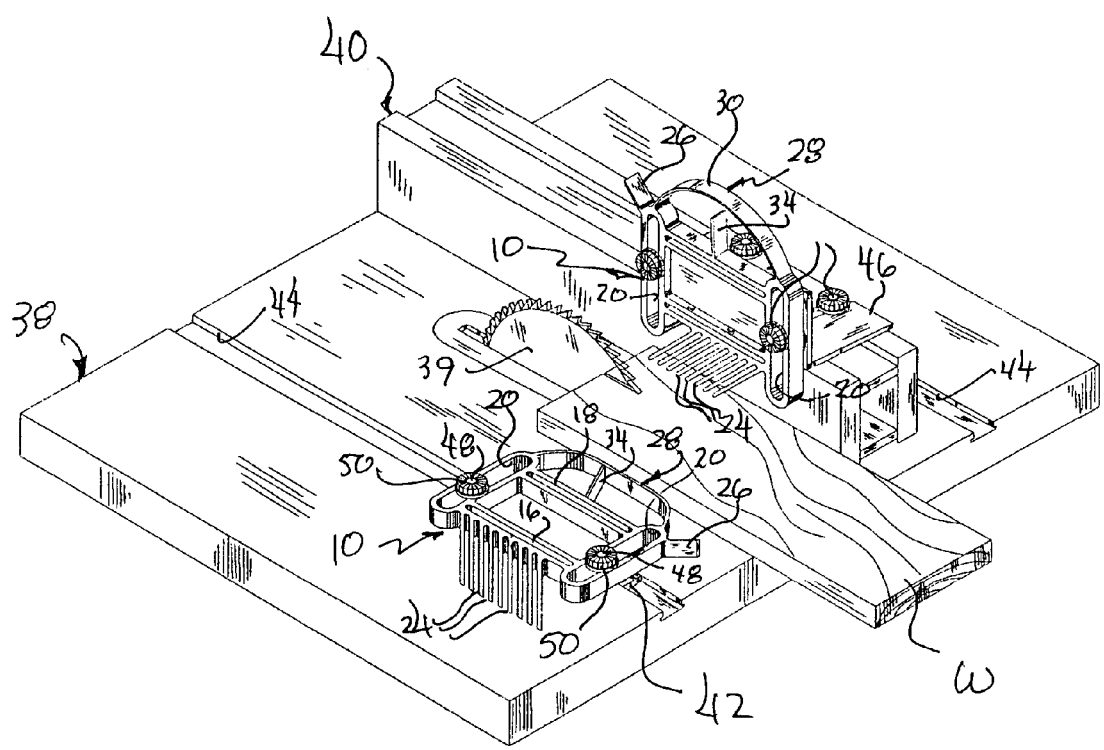
FIG. 4 is a perspective view showing the top of a table saw with tension boards embodying the invention mounted upon both the table and also upon the rip fence of the machine.

Turning now in greater detail to FIG. 4 of the drawings, two tension boards are mounted upon a table saw (only the top features of the machine being depicted), comprised of the table, generally designated by the numeral 48, the blade 39, and the rip fence assembly, generally designated by the numeral 40. A slide, or slot-adapter, 42 is received in one of the slots 44 machined into the upper surface of the table 38, and a right-angle mounting bracket 46 is secured to the top edge of the fence 40 by fasteners 47.

One of the tension boards is mounted upon the slide 42, using nuts or knobs 50 threadably engaged on bolts 48 extending through the slots 20. The tension board is spaced from the confronting surface of the fence assembly 40 to define a path for the workpiece "W" to the blade 39. The path is of course narrower than the board stock W, which consequently deflects and depresses the bow member 28 toward the marginal edge portion 18 of the body 10, with the resiliency of the strip 30 generating a force sufficient to urge the board firmly against the vertical surface of the fence assembly.

The feather elements 24 of the second tension board, mounted upon the angle bracket 46, simultaneously apply a downward force to the top of the stock W to maintain it firmly against the surface of the table 38. Needless to say, the vertical position of the second tension board on the bracket 46 is readily adjusted by loosening of the knobs 50, enabling displacement of the associated bolts along the lengths of the slots 20.

It will be noted that, in its depressed state the strip 30 contacts the free end of the tension gauge tab 34, indicating that a certain, design-level force is being exerted upon the workpiece. If the spacing between the tension board and the fence assembly were excessively narrow, however, the tab 34 would simply pivot on the hinge 36 to permit the stock to pass without undue interference.

Turning now to FIG. 5 in detail, the tension board illustrated therein has a body, generally designated by the numeral 10', from which extends a second bow member, generally designated by the number 28', rather than the array of feathers 24 present in the first embodiment described. The bow member 28' has flexure characteristics that are substantially different from those of bow member 28, as may result from the strip 30' being thicker or thinner, or wider or narrower, than the strip 30 (the difference will usually be subtle, and hence not apparent in a drawing), thus enabling the user to choose a biasing effect that is optimal under the circumstances. For example, one of the bow members may exert a maximum design force of 15 psi while, at the same distortion level, the other exerts a force of 30 psi. It will be appreciated that the tension differential may be achieved by other means, such as by varying the lengths of the strips 30, 30', the bow arc radii, etc.

As indicated in FIG. 2, the small single finger 26 is used by inverting the tension board on the angle bracket 46. The finger bears upon the top of the stock, exerting a relatively light force sufficient to control fish-tailing (i.e., lateral reciprocation) of the cut piece, and would of course be disposed downstream of the blade for that purpose.

Figure 6:
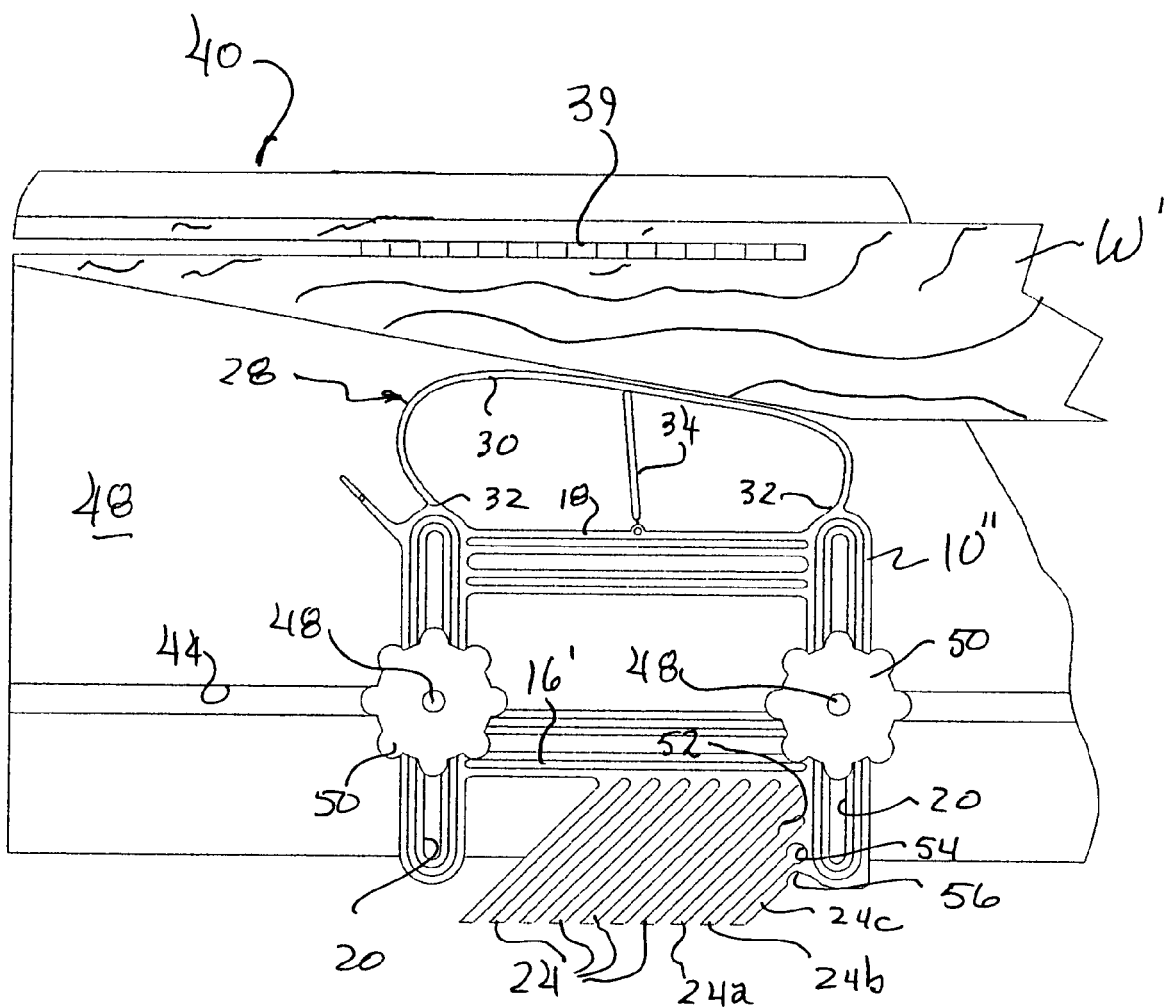
FIG. 6 is a plan view showing another form of tension board embodying the invention, in use for guiding a workpiece, having a tapered end portion, through a table saw.

Turning finally to FIG. 6 in detail, the tension board 10" depicted therein is further modified from those previously described in that three of the fingers 24a, 24b and 24c of the featherboard array are of different lengths and are progressively shorter than the others, albeit of substantially the same width and thickness. The fingers 24a–c are weakened, by thickness-reducing indentations formed at locations 52, 54 and 56 proximate their points of attachment to the marginal edge portion 16', so as to increase flexibility, in inverse proportion to length, to substantially match that of the longer fingers 24 and thereby to enable the tension applied to the workpiece to be uniform at all points across the featherboard array. As will be appreciated, other means may of course be used to reduce rigidity, such by overall thinning or narrowing of a finger.

FIG. 6 also illustrates the unique ability of a tension board embodying the invention to assist in guiding a tapered workpiece through a table saw. As can be seen, the bow member 28 simply deforms as necessary to conformably receive the tapered end portion of the workpiece W' while holding it securely along the fence 40 during its advance against the blade 39.

The tension board of the invention will generally be most economically and effectively fabricated as a one-piece structure, integrally formed by molding of a suitable synthetic resinous material, such as for example high-density polyethylene, polycarbonate, nylon, or any number of other strong, tough polymers. Also, while two primary tension-applying components of a combination tool will usually and advantageously be disposed on opposite marginal portions of a generally rectangular body, they may instead be adjacently disposed, and the body may be of virtually any shape. The tension gauge may enable selection throughout a range of force levels (rather than a single value), such as by providing a scale on an element of the bow member which registers with a cooperating element on the stationary part to indicate the level of force being generated.

Thus, it can be seen that the present invention provides a novel tension board that is, by virtue of its bow member, of bi-directional character to permit ready movement of the stock in either direction. The absence of sharp edges on the bow member permits lifting of the workpiece without marring or damage; force-level variation and control are readily afforded, and the device readily accommodates tapered workpieces and is highly tolerant to misalignment (i.e., orientation in non-square, skewed relationships) relative to the fence and the workpiece. The invention also provides a tension board having a featherboard feature in which a uniform level of tension is produced along an array that includes fingers of different lengths.

Having thus described the invention, what is claimed is:

1. A tension board for guiding a workpiece across the surface of a cutting machine table, comprising: a body having a peripheral portion extending peripherally along a plane extending transversely through said body, and having means for mounting said tension board upon the surface of a cutting machine table with said transversely extending plane through said body being to the cutting machine table surface, and at least one resiliently deformable bow member comprised of a strip of material having opposite end portions fixedly attached at mutually spaced, different points along said peripheral portion of said body and projecting generally arcuately from said different points, away from said body on said transversely extending plane thereof, laterally over the surface of the cutting machine table when so mounted, whereby said bow member can deform resiliently toward said body to cooperate with upstanding structure on the cutting machine table to apply lateral force to a workpiece pushed therebetween, said resiliently deformable bow member always being at a fixed location with respect to said plane.

2. The tension board of claim 1 wherein said body is generally planar, and wherein said bow member extends substantially in the plane of said body.

3. The tension board of claim 1 wherein said body and said bow member are integrally formed, as a single piece.

4. The tension board of claim 3 fabricated from a synthetic resinous material.

5. The tension board of claim 1 wherein said means for mounting comprises at least one slot extending through said body in a direction normal to said transversly extending plane.

6. The tension board of claim 5 wherein said at least one slot is rectilinear and extends on an axis generally perpendicular to an axis between said spaced points along on said peripheral portion of said body.

7. The tension board of claim 1 additionally including a second said bow member projecting from said peripheral portion edge of said body at a location spaced peripherally from said at least one bow member.

8. The tension board of claim 7 wherein the force generated by deformation of said at least one bow member is different from the force generated by said second bow member at the same extent of deformation.

9. The tension board of claim 1 additionally including a tension gauge element attached to one of said body and said strip of material, said tension gauge element cooperating with an element on the other of said body and said strip of material to indicate the level of force generated by said bow member in a deformed state.

10. The tension board of claim 9 wherein said tension gauge element has a free outer end portion spaced from the other of said body and said strip of material when said strip of material is in its non-deformed state, deformation of said strip of material bringing said free outer end portion of said gauge element into contact with said cooperating element on said other of said body and strip of material and being indicative of a level of force generated by said deformed bow member.

11. The tension board of claim 10 wherein said tension gauge element is disposed within the space between said body and said strip of material.

12. The tension board of claim 2 additionally including an array of resiliently deflectable fingers extending parallel to one another from said peripheral portion of said body to which said fingers are attached.

13. The tension board of claim 12 wherein said array of fingers extend substantially in said body plane.

14. The tension board of claim 12 wherein said fingers are substantially identical.

15. The tension board of claim 12 wherein most of said fingers are substantially identical, and wherein at least one of said fingers is substantially shorter than said identical fingers, said at least one finger being so formed as to reduce its rigidity and thereby enable all of said fingers to apply substantially the same force to a workpiece guided therealong.

16. The tension board of claim 15 wherein all of said fingers are of substantially the same width and thickness along the lengths thereof, and wherein said at least one finger is formed with an indentation proximate its point of attachment to said body so as to provide such rigidity reduction thereto.

17. The tension board of claim 2 additionally including a single, resiliently deflectable tab element extending outwardly from said body in said plane thereof.

18. In combination, a cutting machine having a table with a surface; and a tension board for guiding a workpiece across said cutting machine table surface, said tension board comprising: a body having a peripheral portion extending peripherally along a plane extending transversely through said body, and having means for mounting said tension board upon said surface of said cutting machine table with said transversely extending plane through said body being parallel to said cutting machine table surface, and at least one resiliently deformable bow member comprised of a strip of material having opposite end portions fixedly attached at mutually spaced, different points along said peripheral portion of said body and projecting generally arcuately from said different points, away from said body on said transversely extending plane thereof and laterally over said cutting machine table surface, whereby said bow member can deform resiliently toward said body to cooperate with upstanding structure on said cutting machine table to apply lateral force to a workpiece pushed therebetween, said resiliently deformable bow member always being at a fixed location with respect to said plane.

* * * * *